US005711992A

United States Patent [19]
Heitkamp et al.

[11] Patent Number: 5,711,992
[45] Date of Patent: Jan. 27, 1998

[54] ENVIRONMENTALLY SAFER PROCESS OF MANUFACTURING HONEYCOMB PRODUCTS FOR USE IN COMPOSITE MATERIALS USING A WATER-BASED PHENOLIC THERMOSETTING RESIN AND THE PRODUCTS MADE THEREBY

[75] Inventors: Richard R. Heitkamp, Long Beach; Thomas H. Iler, Tustin, both of Calif.; Dale Danver, Miami, Fla.; Liqun Cao, Fullerton, Calif.; Ronald Boyer, Miramar, Fla.

[73] Assignee: Hexcel Corporation, Pleasanton, Calif.

[21] Appl. No.: 573,766

[22] Filed: Dec. 18, 1995

Related U.S. Application Data

[63] Continuation-in-part of Ser. No. 210,978, Mar. 21, 1994, abandoned.

[51] Int. Cl.$^6$ ............................................ B05D 5/00
[52] U.S. Cl. .................. 427/243; 427/385.3; 427/380.4; 427/349.8; 427/391; 427/393.5; 427/395
[58] Field of Search ............................ 427/243, 385.5, 427/395, 389.8, 388.4, 393.5, 391

[56] References Cited

U.S. PATENT DOCUMENTS

| | | | |
|---|---|---|---|
| 3,853,681 | 12/1974 | Kehr | 427/501 |
| 4,636,424 | 1/1987 | Cimemiya et al. | 427/245 |
| 5,116,635 | 5/1992 | Rudbuch | 427/8 |
| 5,258,205 | 11/1993 | Wu | 427/393.6 |
| 5,290,843 | 3/1994 | McDonald et al. | 524/405 |

FOREIGN PATENT DOCUMENTS

| | | |
|---|---|---|
| 0056592 | 7/1982 | European Pat. Off. . |
| 0384369 | 8/1990 | European Pat. Off. . |
| 0624462 | 11/1994 | European Pat. Off. . |

OTHER PUBLICATIONS

S. P. Qureshi et al., 38th Int. Sampe Symposium 5/10—13 (1993) pp. 16–27 (no mo.).

Derw. Abst. 94–097849/12 of JP Sho 60–49158 (no date).

*Primary Examiner*—Janyce Bell
*Attorney, Agent, or Firm*—Luther A.R. Hall

[57] ABSTRACT

The substitution of a water-based phenolic thermosetting resin for a phenolic thermosetting resin in an organic solvent provides a safer and environmentally improved method for making honeycomb core. Improved processing characteristics in components manufactured from such honeycomb core are observed.

15 Claims, No Drawings

ENVIRONMENTALLY SAFER PROCESS OF MANUFACTURING HONEYCOMB PRODUCTS FOR USE IN COMPOSITE MATERIALS USING A WATER-BASED PHENOLIC THERMOSETTING RESIN AND THE PRODUCTS MADE THEREBY

This is a continuation-in-part of application Ser. No. 08/210,978, filed on Mar. 21, 1994, now abandoned.

The instant invention pertains to a process for the preparation of honeycomb cores using a water-based phenolic thermosetting resin as the coating resin in the resin immersion process step.

BACKGROUND OF THE INVENTION

Honeycomb cores for use in various composite structures have been widely used since the 1950's. Such honeycomb cores have found use in a variety of industries, notably in aerospace, marine, automotive, mass transit, sporting goods and defense applications.

The potential environmental problems associated with the use of organic solvents in manufacturing processes has been recognized as seen in the paper by S. P. Qureshi et al., 38th International SAMPE Symposium, May 10–13, 1993, pp 16–27. The authors generically state that waterborne, water dilutable phenolic resins are suitable for making prepregs and honeycombs, but all the specific work reported was limited to prepregs and glass laminates made therefrom. Waterborne resins are not known to be used in the manufacture of honeycomb products, and no performance data associated with honeycomb core processing using such resins are previously known.

U.S. Pat. No. 5,290,843 describes some aqueous phenolic resin compositions used in the preparation of reinforced composite, prepreg and laminate materials. These compositions require that a water-soluble borate be present. Honeycomb structures are only peripherally mentioned and are not specifically described. The instant process does not require the presence of a water-soluble borate component in the instant composition.

The standard method of making honeycomb core is outlined as follows:

1. "Node Lines", which are selected adhesives and which determine cell size, are printed onto a substrate material, such as kraft paper, aluminum foil, fiber glass scrim, aramid paper or polyethylene paper, or other organic or inorganic films or papers and combinations thereof. The printed line of adhesive in matters of width, thickness, degree of cure and pitch are key characteristics which must be carefully controlled.
2. A number of sheets from step 1. are stacked on top of one another.
3. A block of stacked sheets from step 2 are placed between platens and subjected to heat and pressure to cause sheet adhesion at the location of the node lines of adhesive. A backing material is then adhered to the block ends for use in expansion.
4. The block of sheets where the adhesive has been fully cured is now expanded (pulled) to the desired length and width dimensions thus creating the honeycomb structure with the desired cell size and geometry.
5. The block from step 4 may be heat set to give the block its permanent dimensions when the block is made of aramid paper or fiber glass scrim or other substrate materials. This step is unnecessary when the block is made of aluminum or polyethylene paper.
6. The expanded block is then resin coated, usually by dipping into a resin solution, and cured to the desired strength and density of the honeycomb core. Other methods of coating the expanded block include spraying or curtain coating the resin. An alternative method is to precoat the substrate as a first step in the manufacturing process.
7. Finally, the cured resin coated block is cut (sawn) horizontally into sheets.

A range of adhesives and resins is used in preparing honeycomb cores such as epoxy and phenolic thermosetting resins.

DETAILED DISCLOSURE

The instant invention involves an improved process for coating honeycomb core with a water-based or water-dilutable resin where such resins are epoxy, phenolic or the like to provide a more environmentally friendly method of preparing honeycomb products. This is an environmentally improved and safer process for the manufacture of a honeycomb core using the conventional steps in said manufacture, wherein the improvement comprises applying a waterborne, water-dilutable resin to resin coat the honeycomb core.

The instant invention pertains to an improved method for coating the honeycomb core with resin (step 6 above) which involves substitution of a water-based phenolic thermosetting resin for a phenolic thermosetting resin dissolved in an organic solvent such as acetone or isopropanol.

There exist a number of advantages in the use of a waterborne resin when compared to a solvent based resin, for example:

a. The substitution of water for organic solvent(s) in the resin formulation reduces exposure of volatile organic compounds (VOC's) in the workplace, a clear safety and health advantage;

b. The risk of fire and explosion during the resin curing cycle (step 6 above) of the water-based resin is significantly lower than for those resins formulated with flammable solvents such as acetone, isopropanol (alcohol), etc.;

c. At times, the manufacturing process of honeycomb cores requires the removal and manifesting of the dipping resin. The water-based resins are, typically, classified as non-hazardous water whereas the solvent based resins are classified as flammable-hazardous waste material requiring special handling and disposal;

d. From the manufacturing and processing viewpoint, the mixing of water with a water-based resin proceeds at twice the rate of mixing of a solvent with a solvent-based resin system. This offers some processing economies during manufacture of a honeycomb.

Phenolic resins are used to coat the honeycomb core evenly. To ensure a homogeneous and uniform coating, the waterborne resin needs to be temperature controlled to a specific target to maintain constant viscosity. Additionally, the resin solution should be adequately mixed, filtered and recycled at a rate of 5 to 10 nominal volumetric turnovers per hour. Additionally, when dipping core, it is important to maintain a constant level in the dip tank; likewise, when spraying core, the resin spray pressure needs to be controlled; and in the case of curtain coating of honeycomb core, the resin fluid velocity through the block should be laminar and constant. The core must then be dried and cured for a specific time and at an exact temperature to effect cure and to increase core strength and density. Each "dip" (or immersion or curtain coating) of the core into the resin solution will increase core density from 0.20 PCF (3.2 kg/m$^3$) to over 1.0 PCF (16 kg/m$^3$). The amount of resin pickup is related to resin viscosity, percent solids, withdraw rate of the core from the dip tank and related processing factors.

The subsequent curing process must also be very closely controlled to ensure that the chemical curing reaction proceeds at the desire rate. The curing reaction is very exothermic condensation reaction and the process appears to be specific to the oven used to cure the resin coated core.

It is customary for the honeycomb core to undergo a number of "dip-cure" cycles till it reaches the desired core density. Thereafter, the coated core may be "post-cured" to ensure that all residual coating resin reactants and volatiles are removed. Post-curing is an optional step.

It is this step in the overall honeycomb core manufacture that separates the quality of products prepared. Typically, one problem encountered is "popcorn" which is a delamination of the substrate at the node bond and coating buildup normally due to excessive volatiles in the core which become suddenly released during a heating operation [e.g. in some production processes, the core is heated to over 260° C. within one minute]. Another cosmetic effect is "blistering" of the resin. This occurs when the phenolic resin is exposed to a very high temperature or if during a cure cycle, the rate of heat removal is too slow causing the exothermic curing reaction to proceed uncontrolled. Water-based phenolic resins have surprisingly been found to eliminate these undesired effects which regularly occur in solvent-based phenolic resin systems.

Substitution of a water-based phenolic thermosetting resin for the organic solvent based resin is clearly a desirable goal from the environmental point of view. Requirements for the prevention of air pollution necessitate investment in environmental control equipment for organic solvent processes. Such capital investment and increased operating expenses present an economic burden making the goal of using a water-based resin in the instant process highly desirable. VOC (volatile organic compound) reductions of at least 50% can be obtained when utilizing a water-borne phenolic resin system in place of an organic solvent phenolic resin system. The instant process is inherently safer to operate by eliminating the risk of solvent vapor explosions during the dipping and curing stages.

In particular, the instant invention pertains to an environmentally improved process for the manufacture of a honeycomb core using the conventional steps in said manufacture, wherein the improvement comprises applying a waterborne, water-dilutable resin to resin coat the honeycomb core.

More particularly, the instant process pertains to applying the waterborne resin by dipping, immersing, spraying or curtain-coating an aqueous solution of said resin on the honeycomb core, or by precoating the base substrate.

Preferably, the instant process relates to applying the waterborn resin by dipping the honeycomb core into an aqueous solution of the resin.

The waterborne resin is especially a water-based phenolic thermosetting resin.

Preferably, the waterborne, water-dilutable phenolic thermosetting resin is employing a water-based phenolic thermosetting resin formulation to resin coat the honeycomb core, which resin formulation consists essentially of (with each component percent based on the total resin formulation)

(a) 40–70% by weight of a phenol-formaldehyde phenolic resin, (preferably 60–70%)

(b) 0–5% by weight of free formaldehyde, (preferably 0.5 to 2.5%), (c) 0–20% by weight office phenol, (preferably 1–10%), and (d) 60–15% by weight of demineralized water, (preferably 38.5–17.5%), so that the mount of volatile organic compounds emitted during the resin cure cycle is 10% or less by weight of the total resin entering said cycle and so that the density of the core will, ultimately, increase from 1.0 PCF (16 kg/m$^3$) to 15.0 PCF (240.3 kg/m$^3$) or any fractional increment therebetween.

The phenolic resin formulation preferably is 40–70% (preferably 60–70%) by weight solids, the exact amount being adjusted to accommodate the specific honeycomb cell size. The honeycomb cell sizes vary from $\frac{1}{16}$" (1.59 mm) to over 2" (5.08 cm).

Preferably, the water used in the instant process is purified with a carbon absorber, a weak acid cation ion exchange resin, a mixed bed ion exchange resin and finally filtered through a 1 micron filter. The resultant water has a conductivity of less than one megohm-cm (1.0×10$^{-6}$ ohm-cm). Using this demineralized water reduces the formation of chromophors during the process thus reducing discoloration.

A further feature of the instant invention provides additional processes for coating the honeycomb core. The first process involves dipping the honeycomb core into the water borne resin and then removing the core at such a rate as to coat the core with an increased density on an as-is basis of at least 1.0 PCF (16 kg/m$^3$) and not more than 2.0 PCF (32 kg/m$^3$). In typical processing conditions, this rate varies from 0.5 inches/minute (1.27 cm/minute) to 2.0 inches/ minute (5.08 cm/minute), preferably at 1.0 inch/minute (2.54 cm/minute). To maintain equal resin distribution along the walls of the honeycomb a selected volume of high velocity air is uniformly swept across the face of the honeycomb and the opposite side of the honeycomb is airwanded to ensure removal of any residual resin droplets remaining on the honeycomb.

The second process involves allowing the honeycomb core to move at a constant rate in the same plane and apply a thin coating of the water-based phenolic resin using a weir-curtain coating procedure. Curtain coating is more appropriate with water-borne resins while dipping is generally used with organic solvent based resins.

The instant invention also involves a process for curing and post-curing the water-based phenolic resin after coating the honeycomb core by heating the coated core at 80°–125° C. for 30–90 minutes, and then post-curing the phenolic resin at 120°–205° C. for 20–80 minutes.

A preferred embodiment of the instant process involves the curing and post-curing of the water-based phenolic resin. After coating, the resin coated honeycomb core is slowly heated from room temperature to 90° C. at a rate of 5° C./minute. The resin is held at 90° C. for 15 minutes. The temperature is then increased to 120° C. and maintained for 30 minutes. Finally, the phenolic resin is post cured at 185° C. for 45 minutes. Thereafter the temperature is lowered to room temperature. The curing oven is maintained under a slight negative pressure with the heating source being electrical energy, fossil fuels, natural gas or waste heat from other processes or sources. Additionally, it may be beneficial to cure the honeycomb blocks in an inert gas-controlled atmosphere, such as 100% nitrogen or other gaseous mixtures which eliminate oxidative effects on the phenolic resins at elevated temperatures (over 100° C.). During the curing process, the honeycomb cores are held in specially designed framed carts to minimize any dimensional changes.

The especially preferred dip-cure cycle is heating the resin coated honeycomb from room temperature to 82°–93° C. at a rate of 10° C./minute, holding the resin at this temperature for 60 minutes, and post-curing the resin at 121° C. for 30 minutes, then at 135° C. for another 30 minutes and finally at 149° C. for an additional 30 minutes.

The honeycomb cores can be made from any number of substrate materials such as kraft paper, fiber glass fabric, aramid paper, such as NOMEX® (DuPont, aramid paper) or polyolefin paper, such as polyethylene paper, such as TYVEK® (DuPont, polyethylene).

Of course, it is understood that it is possible to add extenders, fillers or other modifiers to the waterborne resin if desired. The weight of such extenders, fillers or other modifiers is not included in calculating the composition of the resin formulation given above.

The following examples are presented for the purpose of illustration only and are not to be construed to limit the scope or nature of the instant invention in any manner whatsoever.

EXAMPLE 1

On a sheet of kraft paper, fiber glass, aramid paper or polyethylene paper (film) is printed nodal lines with an appropriate adhesive for the substrate used.

The sheet is cut and laid up to form a block of material. The block is then pressurized and heated to cure the adhesive material before the block is expanded into a honeycomb and flamed. The honeycomb core is heat set and the core is then reinforced with a water-based phenolic thermosetting resin formulation which consists essentially of (with each component percent based on the total resin formulation)

(a) 65.3% by weight of a phenol-formaldehyde phenolic resin, (b) 0.6% by weight of free formaldehyde, (c) 9.2% by weight of free phenol, and (d) 24.9% by weight of demineralized water, by dipping the honeycomb core into said water-based formulation, purging the core and curing the purged honeycomb core. This latter step is repeated a sufficient number of times to achieve the desired honeycomb core density increase.

The properties of honeycomb cores prepared by this general method are seen in the table below.

| Honeycomb Core Material* | Cell Size (inch) | Density Nominal (lbs/ft³) | Typical Aerospace Requirement* | Actual Result** |
|---|---|---|---|---|
| | | | Compression | |
| NOMEX® | 3/16 | 1.8 | 70 psi | 135 |
| NOMEX® | 1/8 | 3.0 | 220 psi | 370 |
| Fiber-glass | 3/16 | 4.0 | 380 psi | 440 |
| NOMEX® | 5/32 | 5.0 | 600 psi | 1200 |
| | | | Shear tL | |
| NOMEX® | 3/16 | 1.8 | 45 lbs.f | 60 lbs.f |
| NOMEX® | 1/8 | 3.0 | 162 lbs.f | 180 lbs.f |
| Fiber-glass | 3/16 | 4.0 | 230 lbs.f | 290 lbs.f |

-continued

| Honeycomb Core Material* | Cell Size (inch) | Density Nominal (lbs/ft³) | Typical Aerospace Requirement* | Actual Result** |
|---|---|---|---|---|
| | | | Shear tW | |
| NOMEX® | 3/16 | 1.8 | 42 lbs.f | 65 lbs.f |
| Fiber-glass | 3/16 | 4.0 | 120 lbs.f | 160 lbs.f |
| | | | Shortbeam Shear | |
| NOMEX® | 5/32 | 5.0 | 360 lbs.f | 410 lbs.f |
| NOMEX® | 5/32 | 9.0 | 580 lbs.f | 700 lbs.f |

*NOMEX ® is aramid paper (DuPont).
psi is pounds per square inch.
lbs.f is pounds force.
**These values are based on producing commercial size blocks of 52 cubic feet nominal (50 in × 10 in × 18 in).

EXAMPLE 2

Using the general procedure of Example 1 and using NOMEX® honeycomb core material with a honeycomb cell size of 5/32 inch, the following water-based phenolic resin honeycomb core results are obtained.

| Density Nominal (lbs/ft³) | Cure min/tmp°C. | Post-cure min/temp°C. | Bare Compres lbs/in² | Stabilz Compres lbs/in² | Short Beam Shear lb |
|---|---|---|---|---|---|
| Typical Aerospace Requirements | | | 1650 | 1750 | 585 |
| 8.5 | 60/82 | 30/149 | 1990 | 2466 | 685 |
| 8.5 | 60/82 | 30/204 | 2180 | 2700 | 690 |
| 8.5 | 60/93 | 30/149 + 30/204 | 1365 | 2260 | 775 |
| 8.5 | 30/110 + 30/121 | 30/121 + 30/204 | 1810 | 2285 | 840 |
| 9.0 | 15/90 + 30/120 | 45/185 | — | 2396 | 700 |

These data show that honeycomb cores coated by a water-based phenolic thermosetting resin, cured and post-cured under a variety of conditions, have mechanical and physical properties which fully meet industry standards. These data are quite similar to the best properties which are achievable using an organic solvent based phenolic thermosetting resin without the concomitant disadvantages incumbent with the use of organic solvents and the environmental and economic burdens associated therewith as described earlier. These results are obtained using resins with characteristics which meet the performance requirements of MIL-R-9299C.

What is claimed is:

1. An environmentally improved and safer process for the manufacture of a honeycomb core where the conventional steps in said manufacture are (1) printing node lines of adhesive onto a sheet of base substrate material; (2) stacking a number of sheets from step (1) on top of one another; (3) placing a block of stacked sheets from step (2) between platens and subjecting to heat and pressure to cause sheet adhesion at the location of the node lines of adhesive and adhering a backing material to the block ends for use in expansion; (4) expanding (pulling) the block of sheets where the adhesive is fully cured to the desired length and width dimensions thus creating the honeycomb with the desired cell size and geometry; (5) heat setting the block from step (4) when needed to give the block its permanent dimensions; (6) coating the expanded block from step (4) or (5) with a resin and curing said resin to give a honeycomb core of desired strength and density; and (7) finally sawing horizontally the cured resin coating block from step (6) into honeycomb core sheets, wherein the improvement comprises employing a waterborne, water-dilutable phenolic thermosetting resin formulation to resin coat the honeycomb core or to precoat the base substrate, which resin formulation consists essentially of (with each component percent based on the total resin formulation)

(a) about 40–70% by weight of a phenol-formaldehyde phenolic resin solids, (b) about 0–5% by weight of free formaldehyde, (c) about 0–20% by weight of free phenol, and (d) about 60–15% by weight of demineralized water, so that the amount of volatile organic compounds emitted during the resin cure cycle is 10% or less by weight of the total resin entering said cycle and so that the density of the core will increase from 1.0 PCF to 15.0 PCF or any fractional increment therebetween by dipping the core into the waterborne, water-dilutable resin formulation one or more times till the desired core density is achieved, and which allows at least a 50% reduction in VOC's (volatile organic compounds) as compared to the use of an organic solvent phenolic resin.

2. A process according to claim 1 wherein the waterborne resin is applied by dipping, immersing, spraying or curtain-coating an aqueous solution of said resin on the honeycomb core, or by precoating the base substrate.

3. A process according to claim 2 wherein the waterborne resin is applied by dipping the honeycomb core into an aqueous solution of the resin.

4. A process according to claim 1 wherein the resin formulation consists essentially of (a) about 60–70% by weight of a phenol-formaldehyde phenolic resin solids, (b) about 0.5–2.5% by weight of free formaldehyde, (c) about 1–10% by weight of free phenol, and (d) about 38.5–17.5% by weight of demineralized water.

5. A process according to claim 1 wherein the honeycomb core has a cell size from 1/16".

6. A process according to claim 1 wherein said process involves the dipping the honeycomb core into the waterborne resin and then removing the core at such a rate as to coat the core with an increased density of at least 1.0 PCF and not more than 2.0 PCF.

7. A process according to claim 6 wherein the rate varies from 0.5 inches/minute to 2.0 inches/minute.

8. A process according to claim 7 wherein the rate is 1.0 inch/minute.

9. A process according to claim 6 which, in order to maintain equal resin distribution along the walls of the honeycomb, comprises uniformly sweeping a volume of high velocity air across the face of the honeycomb, and then sweeping a volume of high velocity air across the opposite side of the honeycomb core to ensure removal of any residual resin droplets remaining on the honeycomb.

10. A process according to claim 1 which comprises allowing the honeycomb core to move at a constant rate in the same plane and applying a thin coating of the water-based phenolic resin using a weir-curtain coating procedure.

11. A process according to claim 1 which comprises curing and post-curing the water-based phenolic resin after coating the honeycomb core by heating the coated core at 80°–125° C. for 30–90 minutes, and optionally post-curing the phenolic resin at 120°–205° C. for 20–80 minutes.

12. A process according to claim 1 which comprises curing and post-curing of the water-based phenolic resin after coating the honeycomb core by slowly heating the coated core from room temperature to 90° C. at a rate of 5° C./minute, holding the coated core at 90° C. for 15 minutes, increasing the temperature to 120° C. and maintaining it at that temperature for 30 minutes, and finally post curing the phenolic resin at 185° C. for 45 minutes.

13. A process according to claim 1 which comprises curing and post-curing a water-based phenolic resin after coating the honeycomb core by heating the resin coated honeycomb from room temperature to 82°–93° C. at a rate of 10° C./minute, holding the resin at this temperature for 60 minutes, and post-curing the resin at 121° C. for 30 minutes, then at 135° C. for another 30 minutes and finally at 149° C. for an additional 30 minutes.

14. A process according to claim 1 wherein the honeycomb core is made of kraft paper, fiber glass fabric, aramid paper or polyolefin paper.

15. A process according to claim 1 wherein the demineralized water has a conductivity of less than one megohm-cm.

* * * * *